Figure 1:
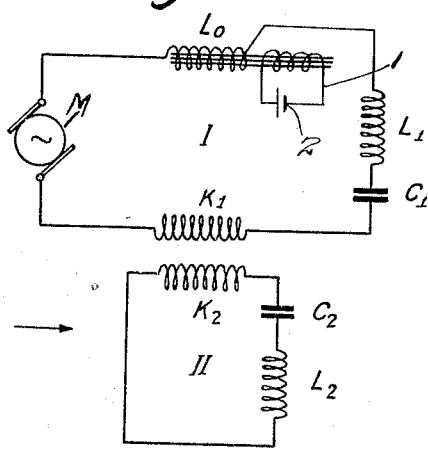

Jan. 1, 1929.  
E. MAYER  
1,696,963  
CIRCUIT ARRANGEMENT FOR RAILROAD SIGNALING  
Filed Aug. 4, 1922

Inventor  
EMIL MAYER  
By his Attorney

Patented Jan. 1, 1929.

1,696,963

UNITED STATES PATENT OFFICE.

EMIL MAYER, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

CIRCUIT ARRANGEMENT FOR RAILROAD SIGNALING.

Application filed August 4, 1922, Serial No. 579,581, and in Germany August 4, 1921.

My invention relates to a system of signaling between a stationary and a moving body as, for instance, a signaling station and a moving railroad train.

If a machine for generating high frequency oscillations is simply connected with an oscillating circuit, and a second oscillating circuit, which we may term a load circuit, is moved in front of the latter, then the strength of the high frequency current in the oscillating circuit of the machine will be increased due to the back effect of the absorption of power by the load circuit. The feeding current coming from the high frequency generator will be only slightly increased, and this is not always sufficient for the purpose of signaling.

The object of the present invention is to introduce means for the purpose of further increasing the current in the circuit of the generator, so that upon the absorption of energy from the generator circuit by the second oscillating circuit, under the same conditions, the current in the generator circuit will be materially increased. The means employed for producing the results may, for instance, be in the form of a sufficiently saturated iron core choke coil arranged in the generator circuit. This coil is provided, when desired, with direct current magnetization, and the proportions are so selected that upon the slightest increase in the current in the generator circuit, such as is caused by the moving in front of it of the absorption circuit, a sudden decrease of the self-inductance of the iron wire choke coil is produced in the circuit of the generator, resulting in a material current increase.

If one of the circuits is placed on a moving object, as a railroad train and the other circuit is placed in a stationary position, as on the road bed of the railroad, it will easily be seen that, when the circuits are brought in juxtaposition, the load circuit will cause an increase in current in the generator circuit sufficient, according to my invention, to operate a signal associated with the generator circuit.

Figure 2:
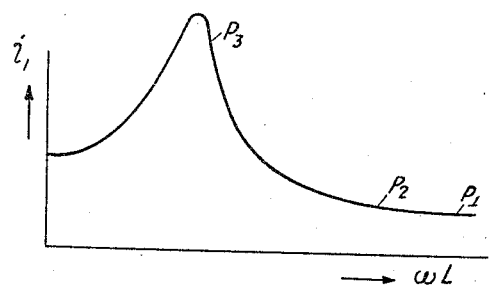

In the drawing,

Fig. 1 is a diagrammatic representation of a circuit arrangement embodying the invention; and Fig. 2 illustrates by means of a curve the functional characteristics of the arrangements shown in Fig. 1.

In the exemplification of the invention shown in Fig. 1, the high frequency generator M is connected with a stationary oscillating circuit I comprising a suitably saturated iron choke coil $L_0$, the air choke coil $L_1$, the capacity $C_1$ and the coupling coil or frame antenna $K_1$. The choke coil $L_0$ may have a direct current winding 1 thereon energized by source of direct current 2. The movable oscillating circuit II comprises a coupling coil or frame antenna $K_2$, the capacity $C_2$ and the self-inductance $L_2$. The individual values of the primary circuit I are so selected that in the absence of the movable oscillating circuit, the whole circuit has a high inductive reactance so that the electromagnetic condition of the circuit may be represented by the point $P_1$ of the resonance curve (see Fig. 2) and only a very weak current flows in the circuit.

In Fig. 2, the ordinates $i$ represent current and the abscissae represent the inductive reactance in circuit I which is equal to $\varpi L$, where $\varpi$ is $2\pi$ times the frequency and L is the inductance of the circuit. Thus it will be seen that near the point $P_2$ the inductance has decreased to such an extent (due to increase of current sufficient to saturate the iron core, automatically decreasing the inductance of iron core coil $L_0$) that the inductive reactance equals the capacitive reactance and the condition of resonance is obtained.

The individual values in the secondary circuit II are so selected that when $K_2$ approaches $K_1$ the circuit II will be tuned to the period of the high frequency generator. Consequently, when $K_2$ approaches $K_1$ a current is generated in circuit II which causes a load current in circuit I. The increase of current in circuit I first causes the inductive reactance to decrease to a value, as shown by point $P_2$. At this point the condition of circuit I is unstable, the increase in current causing a decrease in inductive reactance of coil $L_0$ and the decrease in inductive reactance causing a further increase in current. Equilibrum is again reached near the point $P_3$ when the inductive reactance of $L_0$ has decreased to such an extent that the condition of resonance is reached in circuit I.

The current value in circuit I is now sufficient to operate a signal. Thus it will be seen that a very slight increase in current in circuit I will put this circuit in an unstable condition and when stability is reached, a large current will be flowing in circuit I. The large current flow resulting from the condition of stability may be caused to flow through any convenient one of the many indicating and detecting means well-known in the art and may thus be caused to actuate any desired or convenient electromagnetic relay or signal device which in turn may be caused to give a visual indication to an operator or engineer which will indicate to him the proper operating procedure for his duties.

Having described my invention, what I claim is:

1. A circuit arrangement for signaling purposes consisting of an oscillating circuit, a high frequency generating machine for forcing oscillations into said circuit, an iron core choke coil in said circuit having means for partial continuous magnetic saturation and so dimensioned that a slight increase in current in the circuit will cause the self-inductance of the choke coil to be materially decreased, and a second circuit tuned to the frequency of the generator circuit and adapted to be brought into juxtaposition to the generator circuit to increase the current in the generator circuit, so as to reduce the self-inductance of said choke coil and thereby cause the current in the generator circuit to be further increased to a point such that it may be utilized to initiate the giving of a signal.

2. A circuit arrangement for signaling purposes consisting of an oscillation generator, a normally closed oscillating circuit containing said generator and having its individual values so selected as to cause it to have a high inductive resistance, so that the current in the circuit is normally weak, an iron core choke coil in the circuit of the generator having means for partial continuous magnetic saturation and so dimensioned that a slight increase in current in the generator circuit will cause its self-inductance to be materially decreased, and a second circuit tuned to the frequency of the generator circuit and adapted to be brought into juxtaposition to the generator circuit to increase the current in the generator circuit.

3. An arrangement for signaling purposes comprising a first circuit, a source of alternating voltage and a reactance in said first circuit, said reactance being partially saturated with steady magnetic flux and one whose value beyond a certain point decreases with increase in current thru it, the constants of said first circuit being arranged so that normally not sufficient current flows therethru to operate a signal, a second circuit movable relatively to said first circuit, and means whereby when the distance between said circuits is sufficiently decreased said second circuit causes sufficient current to flow in said first circuit to cause the value of the reactance to change to the value at said point, so that the current thru it automatically increases to a greater extent.

4. An arrangement for signaling purposes, comprising a first circuit, a source of alternating voltage, an inductive reactance and a capacitive reactance in said first circuit, said inductive reactance being partially saturated with steady magnetic flux and one whose value decreases with increase in current therethru, a second circuit, and means whereby, when the two circuits are brought sufficiently close, said second circuit causes the current in said first circuit to increase sufficiently to decrease the value of said inductive reactance till it substantially equals the capacitive reactance, thereby further increasing the current to a still greater extent.

5. An arrangement for signaling purposes, comprising a first circuit, a source of alternating voltage and the alternating current winding of a reactance having a core of magnetic material in said first circuit, said reactance having a direct current magnetization and being one whose value decreases with increase in current through the alternating current winding, a second circuit, and means whereby, when the two circuits are brought sufficiently close, said second circuit causes the current in said first circuit to increase sufficiently to decrease the value of the said reactance so that the current in the first circuit further increases to a still greater extent.

6. An arrangement for signaling purposes, comprising a first circuit, a source of alternating voltage and a reactance in said first circuit, said reactance being partially saturated with steady magnetic flux and one whose value decreases with increase in current therethru, a second circuit, and means whereby, when the two circuits are brought sufficiently close, said second circuit causes the current in said first circuit to increase sufficiently to decrease the value of the said reactance so that the current in the first circuit further increases to a still greater extent.

EMIL MAYER.